United States Patent [19]
Li et al.

[11] Patent Number: 5,673,344
[45] Date of Patent: Sep. 30, 1997

[54] BI-DIRECTIONAL LIGHT PORT FOR INJECTING LIGHT INTO AND TAPPING LIGHT FROM A SIDE OF AN OPTICAL FIBER

[75] Inventors: Yao Li, Monmouth Junction; Ting Wang, Princeton, both of N.J.

[73] Assignee: NEC Research Institute, Inc., Princeton, N.J.

[21] Appl. No.: 667,164

[22] Filed: Jun. 20, 1996

[51] Int. Cl.⁶ .................................................. G02B 6/26
[52] U.S. Cl. .................................. 385/48; 385/43; 385/41
[58] Field of Search ............................... 385/48, 47, 44, 385/43, 42, 41, 45, 46, 31

[56] References Cited

U.S. PATENT DOCUMENTS

| | | | |
|---|---|---|---|
| 3,931,518 | 1/1976 | Miller | 385/48 X |
| 3,936,631 | 2/1976 | Muska | 385/48 X |
| 3,982,123 | 9/1976 | Goell et al. | 385/48 X |
| 5,037,172 | 8/1991 | Heikman et la. | 385/31 |
| 5,432,876 | 7/1995 | Appeldorn et al. | 385/47 X |

OTHER PUBLICATIONS

F. Suzuki, "Novel Plastic image transmission fiber," Proc. SPIE, 1592, 112–132 (1991) No Month.

G. Brun et al, "Plastic optical fiber for lateral illumination: chemical studies and optical measurements," Proc. 4th Int'l. Conf. Plastic Optical Fibers & Applications, Boston, MA, Oct. 17–19, pp. 187–192 (1995).

J. Farenc and P. Destruel, "Illumination, signalisation, and decoration using plastic optical fibrs," Proc. 4th Int'l Conf. Plastic Optical Fibers & Applications, Boston, MA, Oct. 17–19, pp. 203–205 (1995).

S. Sottini, D. Grando, L. Palchetti and E. Giorgetti, "Optical fiber–polymer guide coupling by a tapered graded index glass guide," IEEE J. of Quantum Electronics, 31, 174–180 (1995) No Month.

D.J. Ripin and L. Goldberg, "High efficiency side–coupling of light into optical fibres using imbedded v–grooves," Electronics Letters, vol. 31, (Dec. 7, 1995), pp. 2204–2205.

*Primary Examiner*—Phan T. H. Palmer
*Attorney, Agent, or Firm*—Jeffery J. Brosemer

[57] ABSTRACT

A method and apparatus for tapping and distributing light propagating through a polymer optical fiber (POF). Within the polymer optical fiber, one or more mirrors are constructed. At a point in the POF where an internal mirror is constructed, light traversing the POF is efficiently diverted out of the polymer optical fiber upon striking the mirror. As such, the light which is diverted is effectively tapped off and may be put to an advantageous use.

8 Claims, 4 Drawing Sheets

BI-DIRECTIONAL LIGHT PORT FOR INJECTING LIGHT INTO AND TAPPING LIGHT FROM A SIDE OF AN OPTICAL FIBER

FIELD OF THE INVENTION

The invention relates generally to the field of photonics, and in particular to an optical fiber tap for tapping and distributing light conducted through a polymer optical fiber.

BACKGROUND OF THE INVENTION

Systems incorporating optical fibers are well known and find an ever-increasing variety of applications. Such systems include optical fiber communications systems, medical instruments, copiers, printers, facsimile machines, optical displays and lighting.

Contemporaneously with the increased use of systems utilizing optical fibers, polymer optical fiber (POF) is being recognized as a cost-effective alternative to conventional glass optical fiber for many of the above-mentioned applications. See for example, F. Suzuki, "Novel Plastic image transmission fiber," Proc. SPIE, 1592, 112–132, (1991); G. Brun, C. Farget, M. Reglat, M. Druetta, J. P. Goure, and J. P. Monthcard, "Plastic optical fiber for lateral illumination: chemical studies and optical measurements," in Proc. $4^{th}$ International Conf. Plastic Optical Fibers & Applications, Boston, Mass., Oct. 17–19, 1995, pp. 187–192; J. Farenc, and P. Destruel, "Illumination, signalisation, and decoration using plastic optical fibers," in Proc. 4th International Conf. Plastic Optical Fibers & Applications, Boston, Mass., Oct. 17–19, 1995, pp.203–205; S. Sottini, D. Grando, L. Palchetti, and E. Giorgetti, "Optical fiber-polymer guide coupling by a tapered graded index glass guide," IEEE J. of Quantum Electronics, 31, 174–180 (1995). Among the most frequently cited advantages of using a POF are its fundamental low weight, flexibility, resistance to breaking, low material and connection cost, and immunity to electromagnetic interference.

In many of the applications employing POF, small amounts of light traversing the fiber need to be tapped from the fiber, i.e., in order to broadcast to a large number of nodes, including optical local area networks (LAN's) and in very large scale integrated (VLSI) multiprocessor systems. The utility of such a light tap is often measured, in part, by the light loss as a result of the tap. The magnitude of the loss determines the maximum number of taps and consequently, maximum number of stations that can be concatenated before signal regeneration by a signal repeater is required.

Some previously reported optical fiber taps and techniques require one or more connectors. Such techniques typically necessitate breaking the fiber to make a tap. In addition, the system employing the optical fiber is oftentimes disrupted when a tap is connected or removed. Connector losses of 0.2 to 2.0 dB are typically inherent in these designs, limiting the number of taps that can be connected in a fiber distribution system.

In other optical fiber taps, breaking a fiber or attaching a connector is not necessary, with the optical energy being removed by coupling power to modes that radiate out of the fiber; see, for example, U.S. Pat. Nos. 3,931,518, 3,936,631, and 3,982,123. The generic technique disclosed and claimed therein is to radiate light out of the core of the fiber into the cladding, as by bending the fiber. The light is then coupled out of the fiber cladding by a dielectric body, and subsequently detected by means of a detector.

While a number of such prior-art techniques exist for tapping a light signal conducted by an optical fiber that are useful in many situations, such techniques suffer from one or more infirmities from the standpoint of simplicity, efficiency or cost effectiveness. It is desirable therefore, and a continuing need exists in the art for method and apparatus which effectively permit the tapping and distribution of light conducted by an optical fiber.

SUMMARY OF THE INVENTION

The present invention efficiently taps and distributes light propagating through a polymer optical fiber. The invention comprises, in addition to the polymer optical fiber, one or more mirrors constructed from and located within and between the ends of the POF itself.

Viewed from one aspect, the present invention is directed to a method and apparatus for efficiently tapping and distributing light conducted through a POF. More specifically, at a point in the POF where an internal mirror is created, light traversing the POF is efficiently diverted out of the polymer optical fiber upon striking the mirror. As such, the light which is diverted is effectively tapped off and may be put to an advantageous use.

Viewed from another aspect, the present invention is directed to a method and apparatus for efficiently injecting light into an optical fiber for its distribution. In particular, when light is injected into an optical fiber at a point at which the mirror is located, the light so injected is subsequently diverted by the mirror such that it propagates throughout the fiber.

BRIEF DESCRIPTION OF THE DRAWING

To facilitate reader understanding, identical reference numerals are used to denote identical or similar elements that are common to the figures. The drawings are not necessarily to scale.

DETAILED DESCRIPTION

A preferred embodiment of the invention will now be described while referring to the figures, several of which may be simultaneously referred to during the course of the following description.

Figure 1A:
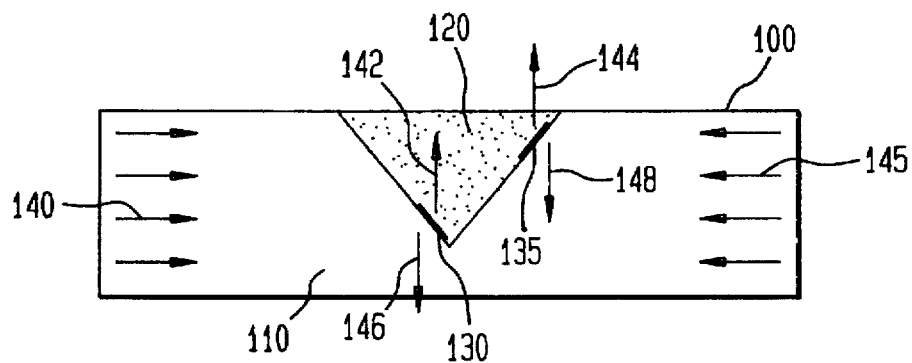
FIG. 1(a) is a cut-away view of a POF showing micro-mirrors formed inside.

Referring now to FIG. 1(a), there is shown a cut-away view of an optical assembly in accordance with a preferred embodiment of the present invention. Polymer optical fiber (POF) 100, which is well known in the art, is depicted having light 140, 145 traversing a length of the POF from opposite directions. Cut and refilled region 120 is shown containing a number of internal mirrors 130, 135. The cut and refilled region containing the internal mirrors may be preferably constructed through a series of micro-cutting, masking, coating and refilling operations.

The light traversing the POF will be deflected upon striking one of the internal mirrors. For example, light 140 traversing a length of POF is deflected as shown by arrows 146 and 144 upon striking mirrors 130 and 135 respectively. Similarly, the deflection of light 145 is shown by arrows 142 and 148 when the light strikes mirrors 130 and 135 respectively. Advantageously, the cut and refilled region serves as a port or tap, thereby allowing light 142 and 144 to exit the POF. Those skilled in the art will readily recognize that the port may be bi-directional, and light may be injected through the side of the fiber as well. In such a case, the injected light strikes the mirror and then propagates through a length of the fiber for distribution or subsequent tapping by another tap.

Figure 1B:
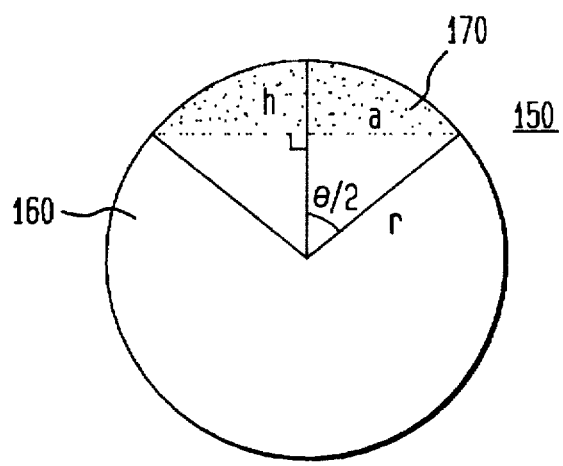
FIG. 1(b) is a cross-sectional view of a POF showing areas to be cut when forming internal mirrors.
Figure 1C:
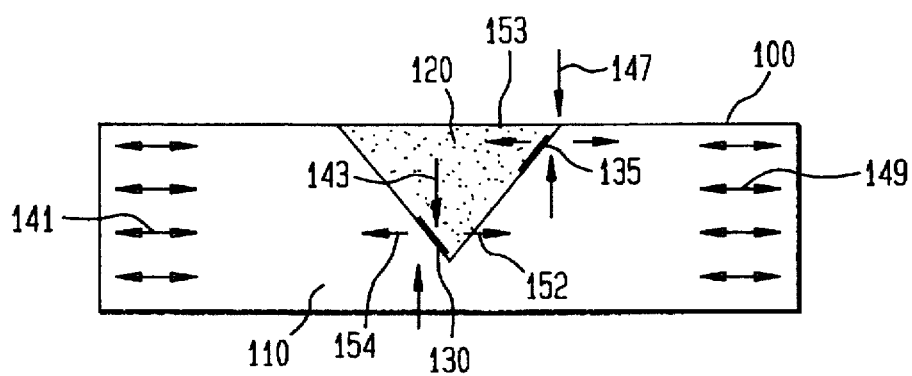
FIG. 1(c) is a cut-away view of a POF showing micro-mirrors formed inside used for bi-directional tapping/insertion of light.

With reference now to FIG. 1(c), there it is shown how the present invention may be used as a tap to inject light into an optical fiber. Specifically, light 147 and 143 enter the fiber through a side and strike a surface of one of the internal mirrors. The light is subsequently deflected by the mirrors and propagates along a length of the fiber as shown by arrows 153 and 154. Bi-directional arrows 141 and 149 indicate that the direction of light propagating through the fiber may advantageously be bi-directional.

As should now be readily apparent, a useful application of the present invention is to deliver equal intensity optical signals to N different locations along the POF, i.e., the delivery of computer clock or data signals.

In this example, a length of POF would be prepared having N side-emitting ports along its length. To achieve a uniform light distribution at each of the N output ports evenly spaced at $\Delta l$, and assuming that a total intensity of input light power is unity, the $i^{th}$ output port has a coupling efficiency of $\eta_i$ where $1 \leq i \leq N$, and the POF has an overall length dependent transmission expressed as $\exp(-\beta l)$ where $\beta$ and $l$ denote a transmission coefficient and fiber length respectively, the following relationship is used:

$$\eta_i = \frac{\eta_i \exp[(i-1)\beta \Delta l]}{(1-\eta_1)(1-\eta_2)\ldots(1-\eta_{i-1})} \quad (1)$$

If all N ports are distributed along a relatively short length of POF, the absorption dominant exponential term in Equation 1 may be omitted. In such a case, it is relatively easy to find that $\eta_1=1/N$, $\eta_2=1/(N-1)$, ... $\eta_{N-1}=0.05$, $\eta_N=1$. Once an individual coupling coefficient is determined, a corresponding size of the internal mirror may be calculated.

With reference now to FIG. 1(b), there is shown a cross-section of POF having core 160 and cut-out area 170 in which a mirror is formed (shown shaded). An area of the mirror is related to a projected depth of the cut h, which can easily be monitored during a cutting operation. Using the parameters shown in FIG. 1(b), a circular sector angle $\theta$ may be calculated as:

$$\theta = 2\cos^{-1}(1-\alpha), \quad (2)$$

where $\alpha = h/r$ is the relative depth of a cut. Within a first order approximation, the intensity inside a large core POF is uniformly distributed. Thus, the mirror coupling coefficient $\eta$ may be defined as the ratio $\eta = S/(\pi r^2)$, where S is the area of the mirror (shown shaded in FIG. 1(b)) and r is the radius of the POF. Since the mirror area S is:

$$S = \frac{\theta r^2}{2} - a\sqrt{r^2 - a^2}, \quad (3)$$

and $$a = r\sin(\theta/2), \quad (4)$$

those skilled in the art can readily understand that the following relations exist between $\eta$ and $\alpha$:

$$\eta = \frac{\cos^{-1}(1-\alpha)}{\pi} - \frac{1}{\pi}\sqrt{\alpha(2-\alpha)(1-\alpha)^2} \quad \text{for } 0 \leq \alpha < 1 \quad (5a)$$

and $$\eta = 1 - \frac{\cos^{-1}(1-\alpha)}{\pi} + \frac{1}{\pi}\sqrt{\alpha(2-\alpha)(1-\alpha)^2} \quad \text{for } 1 \leq \alpha < 2. \quad (5b)$$

Equations (1) and (5) may be used to determine the depth of cuts used to form N mirrors along a length of POF.

Figure 2:
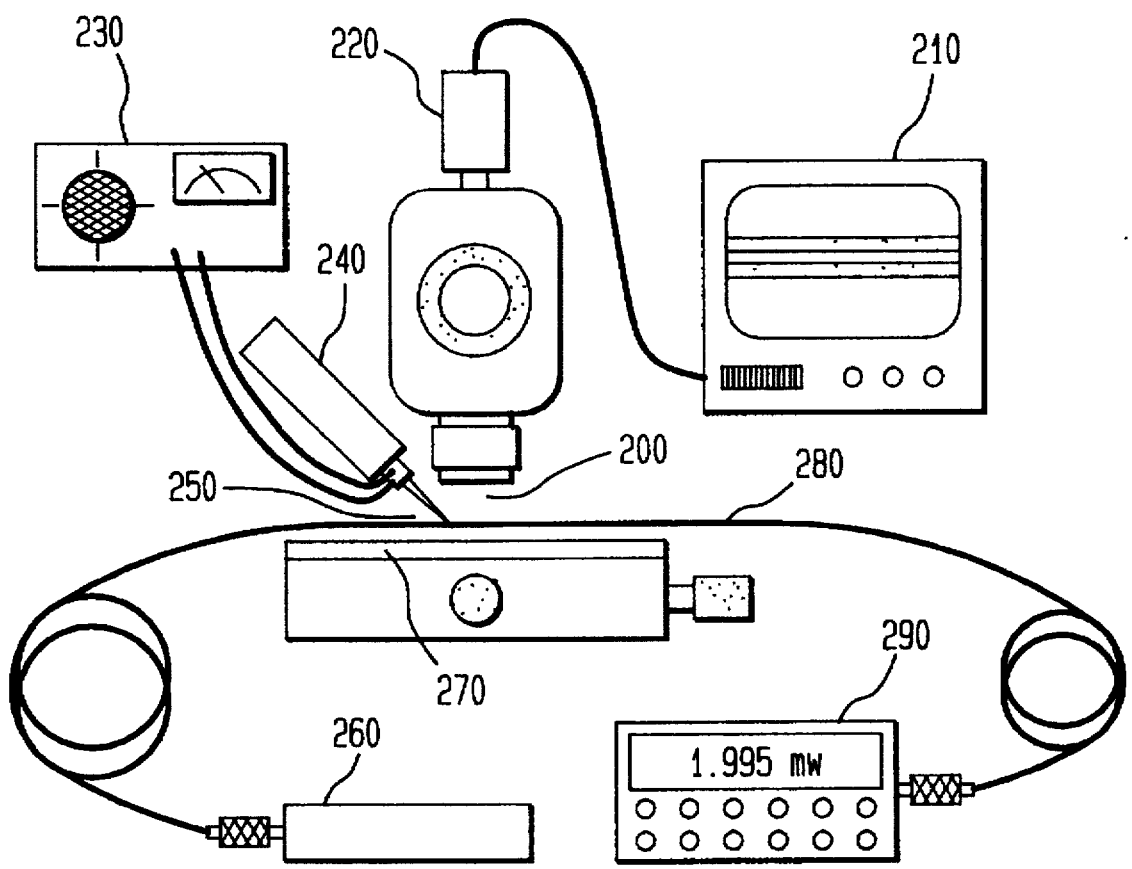
FIG. 2 shows an apparatus for manufacturing a sequence of micro-mirrors along a length of POF.

Referring now to FIG. 2, there is shown a system suitable for the construction of POF having internal mirrors in accordance with the teachings of the present invention. Specifically, POF 280 is fixed to micro-meter controlled X-Y translational stage 270. Knife 250, mounted on a micro-meter controlled rotational, translational stage 240 and heated under control of thermo-electric heat controller, is used to cut precise regions from the POF thereby forming internal mirrors. The knife used may be a polished razor blade. The use of the thermo-electric heat controller permits the accurate selection of a cutting temperature for the knife.

Satisfactory results have been obtained using Polymethylmethacryliate (PMMA) fibers (Model TB-750) such as those produced by Asahi Chemical, Ltd. The diameter of the fiber core is 750 μm and has a refractive index of n=1.4994 at wavelength λ=650 nm. Although the PMMA material is sufficiently soft to be cut at room temperature, experimental results show that using a combination of pressure and a knife temperature in the range of 100° to 100° F. results in a superior finish of the mirror, i.e., surface roughness less than 15 μm.

Figure 3:
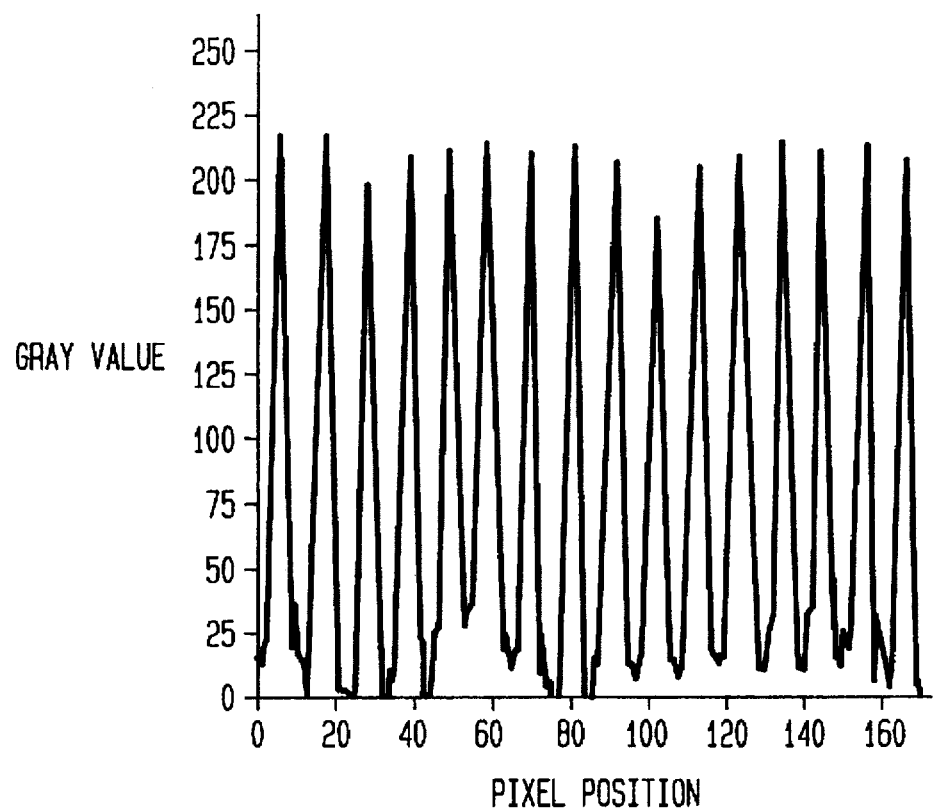
FIG. 3 is a graph showing an intensity of 16 light spots emitted along a length of POF.

Preferably during the cutting process, one end of the POF is connected to a light source, i.e., laser 260 with another end of the POF connected to a digital optical power meter 290. In this manner, the intensity output of each mirror may be accurately controlled through on-line monitoring of residue power output at the power meter end of the POF. With reference now to FIG. 3, there it shows a intensity profile of a series of 16 mirrors uniformly constructed along a 20 mm section of PMMA fiber. Inasmuch as there was no metallic coating deposited on the surface of any of the mirrors, reflections were due to the total internal reflection at PMMA/air interface. Despite this fact, a good contrast ratio of better than 15:1 has been observed.

Those skilled in the art will readily appreciate that the residue light power may be monitored at the individual mirrors, rather than at the output end of the fiber. Using this on-line monitoring method, PMMA fibers have been constructed having 200 side-emitting output ports exhibiting port-by-port intensity fluctuations under 20%.

Figure 4:
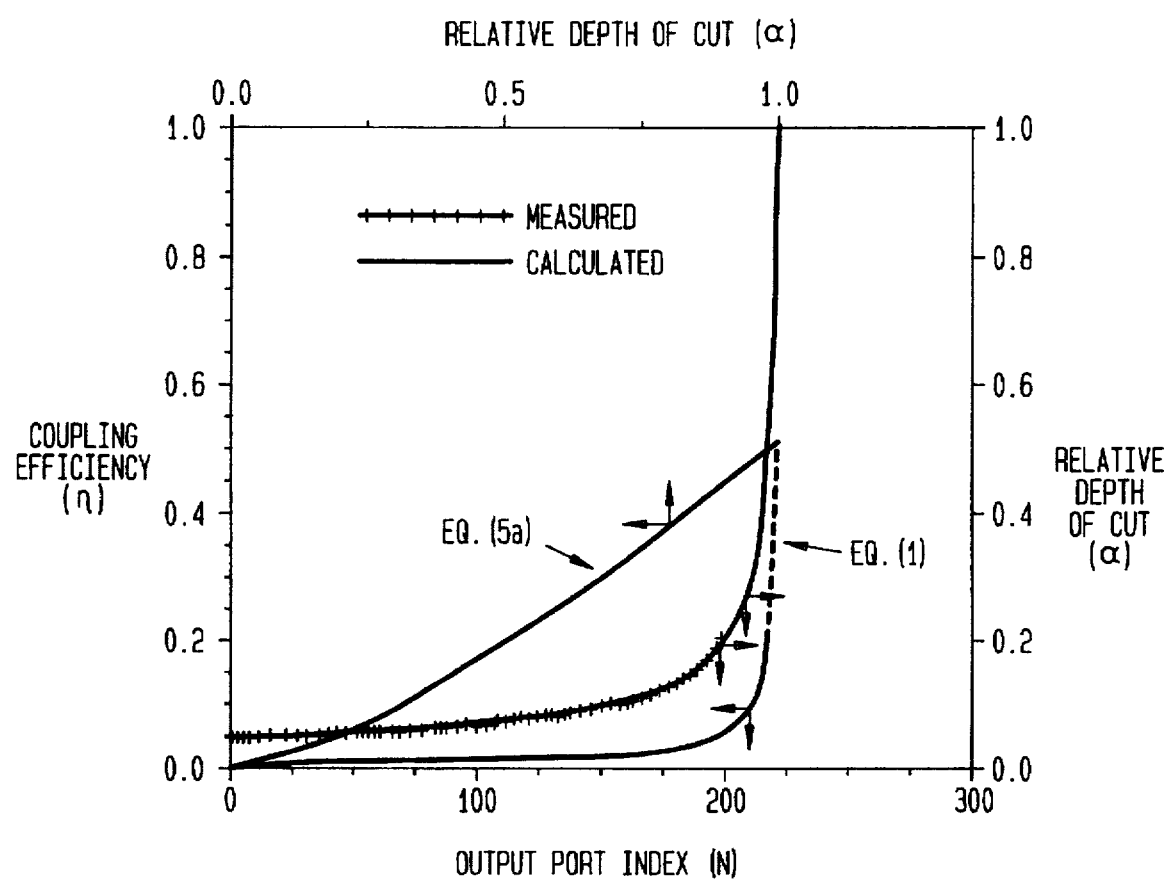
FIG. 4 is a graph showing a coupling efficiency for a particular depth of mirror cut.

With reference now to FIG. 4, values of the cutting parameter $\alpha$, calculated using Equations (1) and (5), are plotted for comparison to that which was subsequently measured. One of every five cuts was sampled during the measurement. To assure the strength of the fiber after cuts, the cutting depths were chosen so that $\alpha_{i=200}=0.25$. The absorption based attenuation was not as important for this fiber as for those situations where light needs to be distributed to a longer distance, since the total fiber length was only 0.4 m.

Straightforward modifications to the above-described mirror formation method can also be employed to allow parallel cuttings. In particular, multiple knifes having predetermined cutting angles and depths may be used simultaneously to speed up the entire fabrication procedure although precise control of light fluctuations is more difficult. Furthermore, by fixing either the fiber position while changing the directions of cutting, or fixing the direction of cutting while changing the fiber feeding direction, light can be coupled out of the fiber in almost any direction in 3D space thereby providing a large degree of flexibility in the application of a finished fiber.

In particular, the mirrors may be either flat or curved. In this manner, light may be diverted out of the fiber through the entire circumference of the fiber, or portions thereof. Furthermore, the light diverted out of the fiber may be diverted out at angles less than perpendicular to the sides of the fiber. Additionally, the mirrors may be made partially reflecting or partially transmitting, depending upon the specific application.

Figure 5:
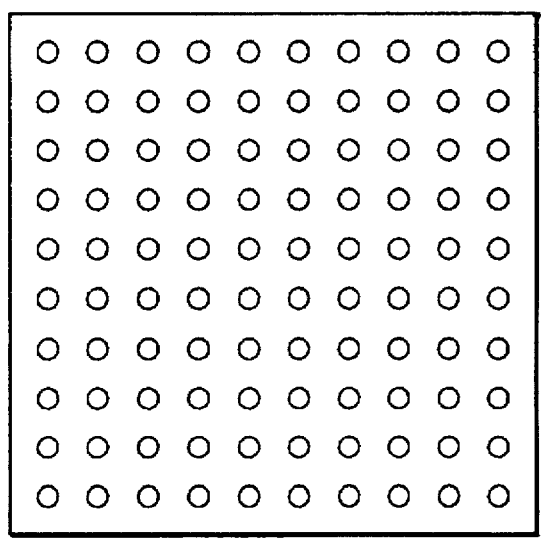
FIG. 5 shows light distributed along a 10×10 optical spot array using a POF constructed according to the present invention.

As an additional example of the present invention, a 2 mm thick transparent polycarbonate plate was machined to create an array of 10 parallel V-groves with a 2 mm spacing between any two consecutive grooves. A long PMMA fiber was then cemented into the grooves. A series of 100 mirrors, cut using the above-described cutting method was then performed. Those mirrors which are subsequently measured to be too small can obviously be enlarged by additional cutting. Conversely, those which are subsequently measured to be too large, may be partially or completely filled with suitable material, i.e., epoxy, PMMA, etc. FIG. 5 shows a 10×10 light spot pattern generated by such a processed plate.

Clearly, it should now be quite evident to those skilled in the art, that while the invention was shown and described in detail in the context of a preferred embodiment, and with various modifications thereto, a wide variety of other modifications can be made without departing from scope of the inventive teachings. For example, well-known laser or other cutting devices may substitute for the mechanical knives uses and described. Similarly, the internal mirrors need not be flat, but rather could be any suitable shape. Therefore the invention should only be limited by the following claims.

I claim:

1. A bi-directional light port, for tapping light from and injecting light into an optical fiber comprising:

one or more mirrors, positioned within the optical fiber such that a desirable portion of light traversing the fiber is deflected out a side of the optical fiber and light striking the side of the fiber adjacent to the mirror is injected into the fiber and reflected by the mirror such that the injected light traverses the fiber and wherein said mirrors are constructed by cutting the fiber and removing a portion of the optical fiber so that a mirror region is created and said mirror region is subsequently refilled with a suitable material.

2. The bi-directional light port according to claim 1 wherein said mirrors further comprise:

a coating, applied to the mirrors wherein said coating is a reflective material that enhances the reflectivity of the mirrors.

3. The bi-directional light port according to claim 2, wherein said mirrors are cut with a sharp instrument.

4. The bi-directional light port according to claim 3 wherein said sharp instrument is heated prior to cutting.

5. The bi-directional light port according to claim 1 further comprising:

one or more opposing mirrors, positioned within the optical fiber such that said injected light strikes both the mirrors and opposing mirrors and traverses the fiber bi-directionally.

6. The bi-directional light port according to claim 1 wherein said optical fiber is coupled to a light source and a power meter such that light power my be monitored during the cutting and refilling of the optical fiber.

7. The bi-directional light port according to claim 1 wherein said deflected light is deflected out of a desirable portion of the circumference of the fiber from 0 to 360 degrees.

8. The bi-directional light port according to claim 1 wherein said injected light is injected into a desirable portion of the circumference of the fiber from 0 to 360 degrees.

* * * * *